ively, 1966, Ser. No. 572,889, now Patent No. 3,452,102, dated June 24, 1969. Divided and this application Jan. 14, 1969, Ser. No. 791,190
Int. Cl. C07c 49/80, 49/82
U.S. Cl. 260—590                2 Claims

ABSTRACT OF THE DISCLOSURE

Novel 1 - phenyl - 1 - hydroxy-6-methoxy-3,4-dihydro-2(1H)-naphthalenones of the formula:

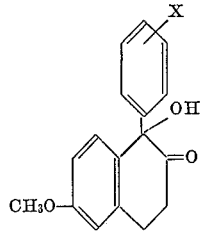

wherein X is hydrogen, halogen, trifluoromethyl or lower-alkyl. These compounds are useful intermediates in the preparation of the corresponding 1,2-diphenyl - 6-methoxy - 1,2,3,4 - tetrahydro-1,2-naphthalenediols.

CROSS REFERENCE TO RELATED APPLICATIONS

This application is a division of application Ser. No. 572,889 filed Aug. 17, 1966 now U.S. Pat. No. 3,452,102.

DETAILED DESCRIPTION OF THE INVENTION

This invention relates to certain diaryl-6-methoxy-1,2,3,4-tetrahydro-1,2-naphthalenediols and more particularly to the 1,2 - diphenyl - 6 - methoxy-1,2,3,4-tetrahydro-1,2-naphthalenediols represented by the following structural formula and to processes for the production thereof:

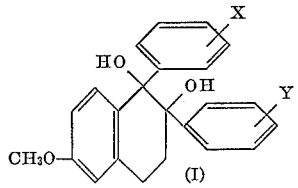

wherein X is hydrogen, halogen, trifluoromethyl or lower-alkyl; and Y is hydrogen, halogen, trifluoromethyl, lower-alkyl or

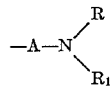

in which A is an alkylene redical of 1 to 6 carbon atoms, inclusive, and R and R₁ taken individually represent lower-alkyl and R and R₁ taken together with the attached nitrogen atom represent a 5 to 7 ring atom saturated heterocyclic radical.

The term "lower-alkyl" means an alkyl group containing from 1 to 8 carbon atoms, inclusive, such as methyl, ethyl, propyl, butyl, pentyl, hexyl, heptyl, octyl, and isomeric forms thereof. The term "halogen" is inclusive of fluorine, chlorine, and bromine. The term "alkylene radical containing from 1 to 6 carbon atoms, inclusive" includes methylene, ethylene, propylene, butylene, pentylene, hexylene, and isomeric forms thereof. The term "a 5 to 7 ring atom saturated heterocyclic radical" is inclusive of pyrrolidino, lower-alkylpyrrolidino such as 2-methylpyrrolidino, 2,2-dimethylpyrrolidino, 3-methylpyrrolidino, and the like, piperazino, lower-alkylpiperazino such as 2-methylpiperazino, 4-methylpiperazino, 2,4-dimethylpiperazino, and the like, piperidino, lower-alkylpiperidino such as 2-methylpiperidino, 3-methylpiperidino, 4,4-dimethylpiperidino, and the like, morpholino, hexamethylenimino, homopiperazino, homomorpholino, and the like.

The term "novel compounds of this invention" as used throughout the specification embraces the acid addition and the quaternary ammonium salts of those compounds of Formula 1 which are tertiary amines, i.e. those compounds wherein Y represents

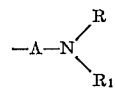

wherein A, R and R₁ have the meaning hereinbefore given. Said acid addition salts comprise the salts of the free bases of Formula 1 wherein Y represents

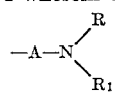

with pharmacologically acceptable acids such as sulfuric, hydrochloric, nitric, phosphoric, lactic, benzoic, methanesulfonic, p-toluenesulfonic, salicyclic, acetic, propionic, maleic, malic, tartaric, citric, cyclohexanesulfamic, succinic, nicotinic, ascorbic acids, and the like. Said quaternary ammonium salts comprise salts obtained by reacting the free bases fo Formula 1 wherein Y represents

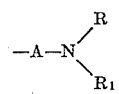

with quaternating agents, for example, lower-alkyl halides, lower-alkenyl halides, di(lower-alkyl) sulfates, aralkyl halides, lower-alkyl arysulfonates, and the like. The term "lower-alkyl" has the significance hereinbefore defined. The term "lower-alkenyl" means an alkenyl radical containing from 3 to 8 carbon atoms, inclusive, such as allyl, 1-methylallyl, 2-methylallyl, 2-butenyl, 2-pentenyl, 2-hexenyl, 2-heptenyl, 2-octenyl, and the like. The term "aralkyl" means an aralkyl group containing from 7 to 13 carbon atoms, inclusive, such as benzyl, phenethyl, phenylpropyl, benzhydryl, and the like. The term "lower-alkyl arylsulfonates" means the esters formed from lower alkanols and arylsulfonic acids such as benzenesulfonic, toluenesulfonic, xylenesulfonic, and like acids. Examples of quaternary salts of basic compounds of Formula 1 are methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl p-toluenesulfonate, ethyl p-toluenesulfonate, and the like.

The novel compounds of this invention possess pharmacological activity. They are active as antifertility, estrogenic, antispermatogenic, and cholesterol lowering agents. Illustratively, the compound 1,2 - diphenyl - 6 - methoxy-1,2,3,4 - tetrahydro-1,2-naphthalenediol exhibits oral antifertility activity in rats when tested by the method described by Duncan et al., Proc. Soc. Exp. Biol. Med. 112, 439–442 (1963).

The novel compounds of this invention are valuable for animal pest control. For example, the compounds of this invention are formulated in combination with baits and/or attractants and placed in feeding stations accessible to undesirable rodents and other small animals including Canidae such as coyotes, foxes, wolves, jackals, and wild dogs and birds such as starlings, gulls, redwing blackbirds, pigeons, and the like, thus reducing hazards to aviation by eliminating their presence on runways and in the vicinity of airfields. The spread of disease, and destruction to property in both rural and urban areas can also be reduced.

For purposes of administartion to birds and to mammals, including man and animals of economic value such as horses, cattle, sheep, pigs, mice, rats, rabbits, and the like, the novel compounds of this invention can be combined with solid or liquid pharaceutical carriers and formulated in the form of tablets, powder packets, capsules, and like solid dosage forms, using starch and like excipients, or dissolved or suspended in suitable solvents or vehicles, for oral or parenteral administration.

In addition to their pharmacological activity, the compounds of this invention are also useful as intermediates. For example, the basic compounds of Formula I wherein Y represents

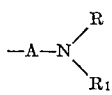

can be reacted with fluosilicic acid to form the fluosilicate salts which in dilute aqueous solution are effective mothproofing agents as more fully disclosed in U.S. Pats. 2,075,359 and 1,915,334.

The novel compounds of this invention can be prepared in accordance with the following reaction scheme:

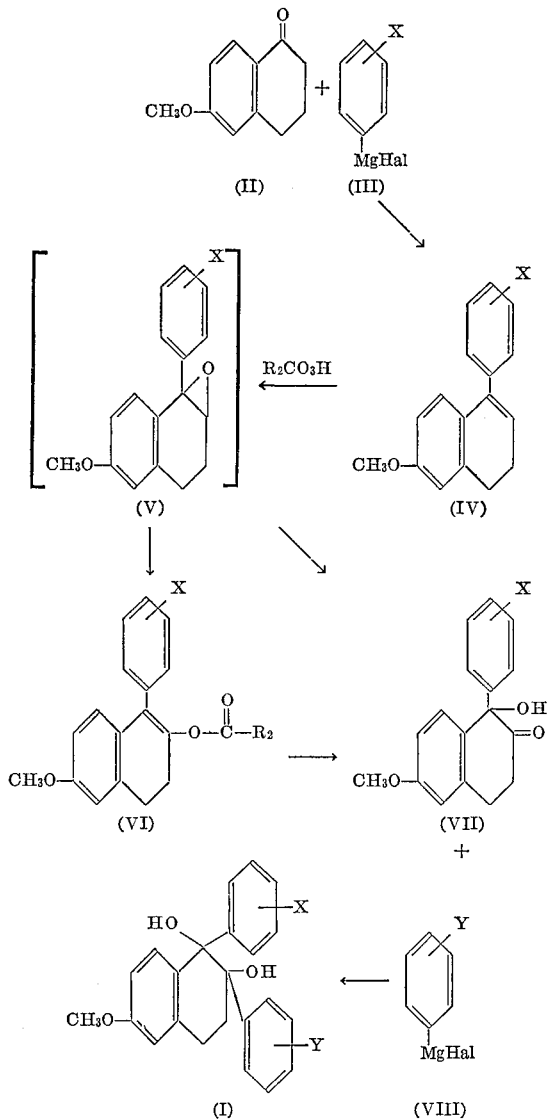

wherein X and Y have the meanings hereinbefore given; Hal represents a halogen atom, e.g., bromine or iodine; and $R_2$ is an aryl radical of 6 to 10 carbon atoms, inclusive, such as naphthyl, phenyl, tolyl, chlorophenyl, fluorophenyl, methoxyphenyl and the like.

The acyloxy radical attached at the 2-position of Formula VI is the radical derived from the peracid used to effect the epoxidation reaction in the previous step.

The starting material (II) is known in the art.

The Grignard reagents (III) and (VIII) are prepared by reaction of magnesium in an anhydrous inert organic solvent such as diethyl ether, dibutyl ether, diisopropyl ether, tetrahydrofuran, and the like, with the appropriately substituted halobenzene, using procedures well known in the art for the preparation of Grignard reagents.

The halobenzenes from which the Grignard reagents (III) and (VIII) are prepared are, for the most part, known compounds which can be prepared by procedures conventional in the art for the preparation of halobenzenes; see, for example, Chemistry of Carbon Compounds, Volume IIIA, p. 113 et seq., 1954, Editor, E. H. Rodd (Elsevier Publishing Company). The halobenzenes in which Y is

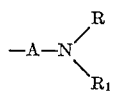

(wherein A, R and $R_1$ have the significance hereinbefore defined) can be prepared by the formation and reduction of the appropriately substituted amide of the corresponding benzoic or phenylalkanoic acid as described hereafter in Preparations 1 and 2.

The novel compounds of this invention represented by Formula I are prepared by first reacting 6-methoxy-1-tetralone (II) with the appropriate Grignard reagent (III) to obtain the corresponding 1-phenyl-6-methoxy-3,4-dihydronaphthalene (IV). The reaction is carried out under conditions normally employed in conducting Grignard reactions. Thus, the reaction is carried out under anhydrous conditions, advantageously in the presence of an inert solvent such as diethyl ether, dibutyl ether, diisopropyl ether, tetrahydrofuran, and the like. The reaction can be carried out at temperatures within the range of about 0° C. to about the boiling point of the solvent employed, and preferably is carried out within the range of about 15° C. to about 30° C. The 1-phenyl-6-methoxy-3,4-dihydronaphthalene (IV) thus obtained, can be isolated from the reaction mixture by conventional procedures. For example, the reaction mixture is decomposed by the addition of water, ammonium chloride, and the like, followed by separation of the organic layer and removal of the solvent therefrom. The residue is purified, if desired, by conventional procedures, for example, by chromatography, recrystallization, and the like.

The 3,4-dihydronaphthalene (IV) thus obtained is oxidized with an organic peracid to give the corresponding 1,2-epoxide (V), which is treated with boron trifluoride etherate without isolating the epoxide from the reaction mixture to give the enol acylate, namely, the corresponding 1 - phenyl - 2 - acyloxy - 6 - methoxy - 3,4 - dihydronaphthalene (VI), wherein the acyl radical is that of the peracid used above for the epoxidation reaction. The enol acylate thus obtained can be isolated from the reaction mixture by conventional methods, for example, chromatography and/or crystallization from a suitable organic solvent, such as methanol, ethanol, isopropanol, acetone, ethyl acetate, chlorinated hydrocarbons and the like.

Peracids which can be used to obtain the desired 1,2-epoxide are for example, m-chloroperbenzoic, perbenzoic, pernaphthoic, p - methylperbenzoic, p - fluoroperbenzoic, p - methoxy perbenzoic, and the like. The epoxidation is carried out in accordance with methods known in the art, for example, Zaugg et al., J. Org. Chem. 15, 1197 (1950).

The boron trifluoride etherate reaction is carried out by treating the intermediate epoxide (V) with boron trifluoride etherate in accordance with methods known in the art, for example, Mills et al., J. Chem. Soc. 4213 (1956).

The epoxidation and boron trifluoride etherate reactions are carried out within a temperature range of about 0° C. to about 40° C. The reactions are preferably conducted at about 5° C. to about 30° C. for a period of time sufficient to complete the reactions.

The enol acylate (VI) thus obtained is then treated with an aqueous alkali metal hydroxide in an alkanol and in the presence of oxygen to obtain the corresponding 1-phenyl-1-hydroxy-6-methoxy - 3,4 - dihydro - 2(1H)-naphthalenone (VII). Bases which can be used are, for example, sodium hydroxide, potassium hydroxide, and the like. Alkanols which can be used include for example, methanol, ethanol, isopropanol, tert.butanol and the like. The reaction is carried out in the presence of air or oxygen at a temperature within the range of about 25° C. to the reflux temperature of the reaction mixture. The reaction is preferably carried out using aqueous potassium or sodium hydroxide and tert.butanol at about 15° C. to about 30° C. until the reaction is complete. A period of from about 2 to 4 hours is generally sufficient. The product (VII) can be recovered from the reaction mixture and purified by conventional methods such as chromatography and/or crystallization from a suitable organic solvent, for example, ligroin, Skellysolve B hexanes (hereinafter referred to as Skellysolve B) and the like.

Alternatively, the compounds of Formula VII can be prepared by treating the 1,2-epoxide (V), with an aqueous acid, such as hydrochloric acid, sulfuric acid, phosphoric acid, and the like. In carrying out this reaction it is not necessary to isolate the epoxide from the reaction mixture in which it is produced. In the preferred embodiment of this reaction sequence, the epoxide is formed by treating the selected compound (IV) with perphthalic acid within a temperature range of about 0° C. to 40° C. until the reaction is complete. Room temperature, about 25° C., is preferred. The epoxide thus obtained is then treated with aqueous hydrochloric acid for a period of about 2 to 4 hours at room temperature to obtain the corresponding 1-phenyl - 1 - hydroxy - 6 - methoxy-3,4-dihydro-2 (1H)-naphthalenone (VII).

The compound (VII) thus obtained is then reacted with the appropriate Grignard reagent (VIII) to obtain the corresponding 1,2 - diphenyl-6-methoxy-1,2,3,4-tetrahydro-1,2-naphthalenediol (I). The Grignard reaction, recovery and purification procedures are carried out in the manner hereinbefore described for the reaction of the compounds of Formulas II and III to give the compounds of Formula IV.

The acid addition salts of those compounds of the invention having Formula I which contain a tertiary amino group can be prepared by methods well known in the art. For example, the acid addition salts of the invention can be preparde by reacting the free base with a pharmacologically acceptable acid as hereinbefore defined, in the presence of an inert solvent such as water, ether, and lower alkanols such as methanol, ethanol, and the like.

The quaternary ammonium salts of these compounds of the invention (I) which contain a tertiary amino group can be prepared by reacting the free base of the Formula I with a quaternating agent, for example, an alkyl halide such as methyl iodide, ethyl iodide, isopropyl bromide, and the like, an alkenyl halide such as allyl chloride, allyl bromide, 2-butenyl bromide, and the like, a dialkyl sulfate such as dimethyl sulfate, diethyl sulfate, and the like, an aralkyl halide such as benzhydryl chloride, benzyl chloride, phenethyl bromide, and the like, or an alkyl arylsulfonate such as methyl p-toluenesulfonate, and the like. Preferably the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

The anion of the quaternary ammonium salt obtained as described above can be exchanged for any other desired anion, e.g. the anions of the various acids enumerated previously, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

The following preparations and examples illustrate the best method contemplated by the inventor for carrying out his invention but are not to be construed as limiting the scope thereof.

PREPARATION 1 p-(3-pyrrolidinopropyl)bromobenzene

A total of 42 ml. of bromine was added dropwise with stirring to a suspension of 90 g. of hydrocinnamic acid in 600 ml. of water over a period of 30 minutes. An additional 500 ml. of water was then added and the mixture was heated on the steam bath for 10 minutes. The resulting mixture was allowed to cool and the solid which separated was isolated by filtration. The solid so obtained was recrystallized twice from aqueous ethanol and then from aqueous acetone to yield 47.74 g. of p-bromohydrocinnamic acid in the form of a crystalline solid having a melting point of 127 to 133° C.

A solution of the acid so obtained in a mixture of 50 ml. of thionyl chloride and 500 ml. of benzene was heated under reflux for 5 hours. The resulting mixture was allowed to stand for 17 hours at room temperature before removing the solvent by distillation under reduced pressure. The crude acid chloride so obtained was dissolved in 200 ml. of benzene and added slowly with stirring over a period of 15 minutes to a solution of 82 ml. of pyrrolidine in 200 ml. of benzene. The resulting mixture was stirred for 3 hours at room temperature before evaporating to dryness under reduced pressure. The residue was dissolved in diethyl ether and water and the organic layer was separated. The organic layer was washed successively with water, 2.5 N hydrochloric acid, and saturated aqueous sodium chloride solution before being evaporated to dryness. The residue was recrystallized from cyclohexane to give 37.91 g. of 1-(p-bromohydrocinnamoyl)pyrrolidine in the form of a crystalline solid having a melting point of 59 to 65° C. An analytical sample was prepared by recrystallization from ligroin.

*Analysis.*—Calc'd for $C_{13}H_{16}BrNO$ (percent): C, 55.33; H, 5.72; Br, 28.32. Found (percent): C, 55.43; H, 5.78; Br, 29.50.

A solution of 37.41 g. of the above amide in diethyl ether was added to a well-stirred suspension of 10 g. of lithium aluminum hydride in diethyl ether at a rate sufficient to produce gentle refluxing. After the addition was complete the mixture was refluxed for a further 17 hours before being cooled in ice and treated in turn with 10 ml. of water, 10 ml. of 20% aqueous potassium hydroxide, and then 30 ml. of water. The resulting mixture was filtered and the solid on the filter was washed well with diethyl ether. The combined filtrate and washings were washed well with water before being evaporated to dryness. The residual oil was distilled under reduced pressure. There was thus obtained 26.83 g. of p-(3-pyrrolidinopropyl)bromobenzene in the form of an oil having a boiling point of 135 to 139.5° C./5 mm.

*Analysis.*—Calc'd for $C_{13}H_{18}BrN$ (percent): C, 58.21; H, 6.76; Br, 29.80. Found (percent): C, 59.31; H, 7.02; Br, 29.80.

Using the above procedure, but replacing hydrocinnamic acid by phenylacetic acid, 2-phenylpropionic acid, 4-phenylbutyric acid and 5-phenylvaleric acid, there are obtained p-(2-pyrrolidinoethyl)bromobenzene, p-(2-pyrrolidino-1-methylethyl)bromobenzene, p-(4-pyrrolidinobutyl)bromobenzene and p-(5-pyrrolidinopentyl)bromobenzene, respectively.

Similarly, using the above procedure but replacing pyrrolidine by dimethylamine, diethylamine, diisopropylamine, dihexylamine, morpholine, piperidine, and piperazine, there are obtained the corresponding p-(3-dimethylaminopropyl)-, p-(3-diethylaminopropyl)-, p-(3-diisopropylaminopropyl)-, p-(3-dihexylaminopropyl)-, p-(3-morpholinopropyl)-, p-(3-piperidinopropyl)-, and p-(3-piperazinopropyl)bromobenzenes.

PREPARATION 2 p-(pyrrolidinomethyl)bromobenzene

A mixture of 30 g. of p-bromobenzoic acid, 60 ml. of thionyl chloride and 60 ml. of benzene was heated under reflux for 4 hours. The solvent and excess reagent were removed under reduced pressure. The residual oil was dissolved in 100 ml. of benzene and added over a period of 30 minutes to 35 ml. of pyrrolidine in 10 ml. of benzene. The mixture so obtained was stirred for 2 hours before being washed successively with water, 2.5 N hydrochloric acid, and saturated aqueous sodium chloride solution. The washed solution was evaporated to dryness and the residue was recrystallized from petroleum ether. There was thus obtained 33.71 g. of 1-(p-bromobenzoyl)pyrrolidine in the form of a crystalline solid having a melting point of 77 to 79° C.

Analysis.—Calc'd for $C_{11}H_{12}BrNO$ (percent): C, 51.98; H, 4.76; Br, 31.45. Found (percent): C, 52.12; H, 4.63; Br, 31.64.

A solution of 33.71 g. of 1-(p-bromobenzoyl)pyrrolidine is 400 ml. of diethyl ether was added to a well stirred suspension of 10 g. of lithium aluminum hydride in diethyl ether over a period of 1.5 hr. The resulting mixture was heated under reflux for 3 hours and then were added, in turn, 10 ml. of water, 10 ml. of 15% aqueous sodium hydroxide solution, and 30 ml. of water. The solid which separated was isolated by filtration and washed well with diethyl ether on the filter. The combined filtrates were washed with water and saturated aqueous sodium chloride solution before being evaporated to dryness. The residual oil was distilled under reduced pressure. There was thus obtained 16.62 g. of p-(pyrrolidinomethyl)bromobenzene having a boiling point of 88 to 92° C. at a pressure of 0.6 mm.

Analysis.—Calc'd for $C_{11}H_{14}BrN$ (percent): C, 55.01; H, 5.88; Br, 33.28. Found (percent): C, 55.82; H, 5.94; Br, 33.08.

EXAMPLE 1

1-phenyl-6-methoxy-3,4-dihydronaphthalene (IV)

A solution of 18.6 g. of 6-methoxy-1-tetralone (II) in 200 ml. of diethyl ether was added to an ice-cooled solution of 0.3 mole of phenylmagnesium bromide (III) in 300 ml. of diethyl ether. The reaction mixture was stirred for about 18 hours at room temperature, 50 ml. of water was then added, followed by 200 ml. of saturated aqueous ammonium chloride solution. The organic layer was separated, washed with water and brine and taken to dryness. The residual solid thus obtained was recrystallized from ligroin to give 18.56 g. of 1-phenyl-6-methoxy-3,4-dihydronaphthalene (IV), M.P. 65–69° C. (lit. 65–67° C.).

In the same manner following the procedure of Example 1, but substituting in place of phenylmagnesium bromide equivalent amounts of other Grignard reagents of Formula III, such as, for example:

p-tolylmagnesium bromide,
p-ethylphenylmagnesium bromide,
p-fluorophenylmagnesium bromide,
p-chlorophenylmagnesium bromide,
o-propylphenylmagnesium bromide,
o-bromophenylmagnesium bromide,
m-tolylmagnesium bromide,
m-isopropylphenylmagnesium bromide, and
m-trifluoromethylphenylmagnesium bromide there are respectively obtained:

1-(p-tolyl)-6-methoxy-3,4-dihydronaphthalene,
1-(p-ethylphenyl)-6-methoxy-3,4-dihydronaphthalene,
1-(p-fluorophenyl)-6-methoxy-3,4-dihydronaphthalene,
1-(p-chlorophenyl)-6-methoxy-3,4-dihydronaphthalene,
1-(o-propylphenyl)-6-methoxy-3,4-dihydronaphthalene,
1-(o-bromophenyl)-6-methoxy-3,4-dihydronaphthalene,
1-(m-tolyl)-6-methoxy-3,4-dihydronaphthalene,
1-(m-isopropylphenyl)-6-methoxy-3,4-dihydronaphthalene, and
1-(m-trifluoromethylphenyl)-6-methoxy-3,4-dihydronaphthalene.

EXAMPLE 2

1-phenyl-2-(m-chlorobenzoyloxy)-6-methoxy-3,4-dihydronaphthalene (VI)

A solution of 14.32 g. of 1-phenyl-6-methoxy-3,4-dihydronaphthalene (IV) in about 150 ml. of diethyl ether was cooled in an ice-bath and treated with 13.12 g. of m-chloroperbenzoic acid. At the end of 18 hours reaction time in the cold and 3½ hours at room temperature, thin layer chromatography revealed the starting material to be entirely consumed. There was then added 7.8 ml. of boron trifluoride etherate. Following an additional 18 hours reaction period at room temperature, the mixture was washed with aqueous sodium bicarbonate solution, water and brine. The residue which remained when the solvent was removed was chromatographed over magnesium silicate (Florisil) and eluted with 1.25% acetone in Skellysolve B. The crystalline fractions thus obtained were combined and recrystallized from methanol to yield 9.59 g. of 1-phenyl-2-(m-chlorobenzoyloxy)-6-methoxy-3,4-dihydronaphthalene, M.P. 98–100.5° C.

An analytical sample of 1-phenyl-2-(m-chlorobenzoyloxy)-6-methoxy-3,4-dihydronaphthalene melted at 99–101.5° C., $\lambda_{max}$ 270 m$\mu$ ($\epsilon$=11,000); the NMR spectrum showed a 4 proton $A_2B_2$ pattern centered at 2.95 $\delta$.

Analysis.—Calc'd for $C_{24}H_{19}ClO_3$ (percent): C, 73.75; H, 4.90; Cl, 9.07. Found (percent): C, 73.47; H, 4.94; Cl, 9.28.

In the same manner following the procedure of Example 2, but substituting other compounds of Formula IV as the starting material in place of 1-phenyl-6-methoxy-3,4-dihydronaphthalene and using m-chloroperbenzoic acid or substituting therefor other aryl peracids, such as those hereinbefore listed, is productive of the corresponding enol acylate (VI) wherein the acyloxy radical is derived from the particular peracid used to obtain the intermediate epoxide. The following are representative:

1-(p-tolyl)-6-methoxy-3,4-dihydronaphthalene and perbenzoic acid to obtain 1-(p-tolyl)-2-benzoyloxy-6-methoxy-3,4-dihydronaphthalene;

1-(p-ethylphenyl)-6-methoxy-3,4-dihydronaphthalene and α-pernaphthoic acid to obtain 1-(p-ethylphenyl)-2-(α-naphthoyloxy)-6-methoxy-3,4-dihydronaphthalene;

1-(p-fluorophenyl)-6-methoxy-3,4-dihydronaphthalene and p-methylperbenzoic acid to obtain 1-(p-fluorophenyl)-2-(p-methylbenzoyloxy)-6-methoxy-3,4-dihydronaphthalene;

1-(p-chlorophenyl)-6-methoxy-3,4-dihydronaphthalene and p-fluoroperbenzoic acid to obtain 1-(p-chlorophenyl)-2-(p-fluorobenzoyloxy)-6-methoxy-3,4-dihydronaphthalene;

1-(o-propylphenyl)-6-methoxy-3,4-dihydronaphthalene p-methoxyperbenzoic acid to obtain 1-(o-propylphenyl)-2-(p-methoxybenzoyloxy)-6-methoxy-3,4-dihydronaphthalene;

1-(o-bromophenyl) - 6 - methoxy-3,4-dihydronaphthalene and perbenzoic acid to obtain 1-(o-bromophenyl)-2-benzoyloxy-6-methoxy-3,4-dihydronaphthalene;

1-(m-tolyl)-6-methoxy-3,4 - dihydronaphthalene and α-pernaphthoic acid to obtain 1-(m-tolyl)-2-(α-naphthoyl oxy)-6-methoxy-3,4-dihydronaphthalene;

1-(m-isopropylphenyl)-6-methoxy - 3,4 - dihydronaphthalene and p-methylperbenzoic acid to obtain 1-(m-isopropylphenyl)-2-(p-methylbenzoyloxy) - 6-methoxy-3,4-dihydronaphthalene; and 1-(m-trifluoromethylphenyl)-6-methoxy-3,4-dihydronaphthalene and p-fluoroperbenzoic acid to obtain 1-(m-trifluoromethylphenyl) - 2 - (p-fluorobenzoyloxy - 6 - methoxy-3,4-dihydronaphthalene.

EXAMPLE 3

*1-phenyl-1-hydroxy-6-methoxy-3,4-dihydro-2(1H)-naphthalenone (VII)*

A mixture of 5.84 g. of 1-phenyl-2-(m-chlorobenzoyloxy)-6-methoxy-3,4-dihydronaphthalene and 1.5 ml. each of 50% aqueous potassium hydroxide solution and water in 100 ml. of tertiary butyl alcohol was stirred at room temperature for a period of about 2½ hours. The mixture was taken to dryness in vacuo and the residue thus obtained was suspended in water and collected on a filter. Two recrystallizations from ligroin afforded 2.58 g. of 1-phenyl-1-hydroxy-6-methoxy-3,4-dihydro-2(1H)-naphthalenone, M.P. 87–87.5° C. The mixed melting point with the same product obtained in Example 4 was 84–87° C.

In the same manner other compounds of Formula VII are prepared by following the procedure of Example 3, but substituting other enol acylates of Formula VI in place of 1-phenyl-2-(m-chlorobenzoyloxy)-6-methoxy-3,4-dihydronaphthalene; for example, using those prepared and named in the last paragaph of Example 2 above there are respectively obtained:

1-(p-tolyl)-1-hydroxy-6 - methoxy-3,4 - dihydro-2(1H)-naphthalenone, 1-(p-ethylphenyl)-1-hydroxy-6-methoxy - 3,4-dihydro-2 (1H)-naphthalenone, 1-(p-fluorophenyl)-1-hydroxy-6-methoxy - 3,4-dihydro-2 (1H)-naphthaloenone, 1-(p-chlorophenyl)-1-hydroxy-6 - methoxy-3,4-dihydro-2 (1H)-naphthalenone, 1-(o-propylphenyl)-1-hydroxy - 6 - methoxy-3,4-dihydro-2 (1H)-naphthalenone, 1-(o-bromophenyl)-1-hydroxy-6-methoxy - 3,4-dihydro-2 (1H-naphthalenone, 1-(m-tolyl)-1-hydroxy-6-methoxy - 3,4 - dihydro-2(1H)-naphthalenone, 1-(m-isopropylphenyl)-1-hydroxy - 6-methoxy-3,4-dihydro-2(1H)-naphthalenone, and 1-(m-trifluoromethylphenyl)-1 - hydroxy-6-methoxy-3,4-dihydro-2(1H)-naphthalenone.

EXAMPLE 4

*1-phenyl-1-hydroxy-6-methoxy-3,4-dihydro-2(1H)-naphthalenone (VII)*

A solution of 1.86 g. of 1-phenyl-6-methoxy-3,4-dihydronaphthalene (VI) in 25 ml. of diethyl ether was allowed to stand overnight in the refrigerator with 11.5 ml. of 0.88 N perphthalic acid in diethyl ether. The reaction mixture was filtered to remove the precipitated acid and the filtrate taken to dryness. The residue thus obtained was disoslved in diethyl ether and shaken with 50 ml. of 1.25 N hydrochloric acid for 3 hours. The ethereal layer was separated, and the residue thus obtained was chromatigraphed on Florisil and eluted with 3% aqueous acetone. The partly crystalline fractions were combined and rechromatographed. The solid thus obtained was recrystallized twice from cyclohexane to give 1-phenyl-1-hydroxy-6-methoxy-3,4 - dihydro-2(1H)-naphthalenone, M.P. 85.5–87.5° C.

*Analysis.*—Calc'd for $C_{17}H_{16}O_3$ (percent): C, 76.10; H, 6.01. Found (percent): C, 76.23; H, 6.07.

In the same manner other compounds of Formula VII are prepared by following the procedure of Example 4 but substituting as starting materials other compounds of Formula IV in place of 1-phenyl-6-methoxy-3,4-dihydronaphthalene. For example, using the compounds prepared and listed in the last paragraph of Example 1 as starting materials there are respectively obtained the same compounds as listed in Example 3, above.

Likewise, other peracids such as those named hereinabove can be used in place of perphthalic acid.

EXAMPLE 5

*1,2-diphenyl-6-methoxy-1,2,3,4-tetrahydro-1,2-naphthalenediol (I)*

A solution of 1.10 g. of 1-phenyl-1-hydroxy-6-methoxy-3,4-dihydro-2(1H)-naphthalenone in about 25 ml. of tetrahydrofuran was added to the Grignard reagent prepared from 4.2 ml. of bromobenzene and 1.0 g. of magnesium in 50 ml. of tetrahydrofuran, with ice-bath cooling. The reaction mixture was allowed to stand for about 18 hours at room temperature and then 50 ml. of saturated aqueous ammonium chloride solution was added. The organic layer was separated, washed with water and brine and taken to dryness. The residue thus obtained was recrystallized from aqueous ethanol to give 0.88 g. of 1,2-diphenyl-6-methoxy-1,2,3,4-tetrahydro-1,2-naphthalenediol, M.P. 193–197° C.

An analytical sample of 1,2-diphenyl-6-methoxy-1,2,3, 4-tetrahydro-1,2-naphthalenediol melted at 196–197° C.

*Analysis.*—Calc'd for $C_{23}H_{22}O_3$ (percent): C, 79.74; H, 6.40. Found (percent): C, 79.06; H, 6.51.

In the same manner other compounds of Formula I are prepared by following the procedure of Example 5 but using other Grignard reagents of Formula VIII such as those listed in Example 1, above; for example, using those prepared from p-bromotoluene, p-bromofluorobenzene and m-trifluoromethylbromobenzene and the like, there are respectively obtained:

1-phenyl-2-(p-tolyl)-6-methoxy - 1,2,3,4-tetrahydro-1,2-naphthalenediol;

1-phenyl-2-(p-fluorophenyl)-6-methoxy-1,2,3,4-tetrahydro-1,2-naphthalenediol;

1-phenyl-2-(m-trifluoromethylphenyl) -6-methoxy-1,2,3,4-tetrahydro-1,2-naphthalenediol;

and the like.

Similarly, other compounds of Formula VII can likewise be reacted with the appropriate Grignard reagent using the procedure of Example 5 to obtain the corresponding compounds of Formula I. The following are representative:

1-(p-tolyl)-1-hydroxy-6 - methoxy - 3,4-dihydro-2(1H)-naphthalenone with the Grignard prepared from bromobenzene to obtain 1-(p-tolyl)-2-phenyl-6-methoxy-1,2,3,4-tetrahydro-1,2-naphthalenediol;

1-(p-fluorophenyl)-1-hydroxy-6-methoxy-3,4-dihydro-2(1H)-naphthalenone with the Grignard prepared from p-bromofluorobenzene to obtain 1,2-bis(p-fluorophenyl)-6-methoxy-1,2,3,4-tetrahydro-1,2-naphthalenediol;

1-(o-propylphenyl)-1-hydroxy-6-methoxy-3,4-dihydro-2-(1H)-naphthalenone with the Grignard prepared from p-bromotoluene to obtain 1-(o-propylphenyl)-2-(p-tolyl)-6-methoxy-1,2,3,4-tetrahydro-1,2-naphthalenediol, and 1-(m-trifluoromethylphenyl)-1-hydroxy-6-methoxy-3,4-dihydro-2(1H)-naphthalenone with the Grignard prepared from m-trifluoromethylbromobenzene to obtain 1,2-bis(m-trifluoromethylphenyl)-6-methoxy-1,2,3,4-tetrahydro-1,2-naphthalenediol; and the like.

EXAMPLE 6

*1-phenyl - 2 - [p - (3 - pyrrolidinopropyl)phenyl]-6-methoxy-1,2,3,4-tetrahydro - 1,2 - naphthalenediol (I) and the hydrochloride and hydroiodide thereof*

A solution of 5 g. of 1-phenyl-1-hydroxy-6-methoxy-3,4-dihydro-2(1H)-naphthalenone in tetrahydrofuran is added to an ice-cooled solution of the Grignard reagent prepared from 5.36 g. of p-(3-pyrrolidinopropyl)bromobenzene and 0.5 g. of magnesium in 50 ml. of tetrahydrofuran. The resulting mixture is allowed to stand for about 17 hours at room temperature before being decomposed by the careful addition of water. The mixture so obtained is filtered and the organic filtrate is washed with water and saturated aqueous sodium chloride solution before being evaporated to dryness. The residue thus obtained is dissolved in diethyl ether and the ether solution is extracted with three 200-ml. portions of 2.5 N hydrochloric acid. The acid extracts are then thoroughly extracted with methylene chloride and chloroform. These organic extracts are combined and evaporated to dryness to give 1-phenyl-2-[p-(3-pyrrolidinopropyl)phenyl] - 6 - methoxy-3,4-dihydro-1,2-naphthalenediol hydrochloride in the form of a crystalline solid.

The hydrochloride so obtained is dissolved in methylene chloride and washed with aqueous sodium bicarbonate solution. The washed methylene chloride solution is evaporated to dryness to yield 1-phenyl-2-[p-(3-pyrrolidinopropyl)phenyl] - 6 - methoxy - 1,2,3,4 - tetrahydro - 1,2-naphthalenediol. The latter is dissolved in methylene chloride and chromatographed on a column of magnesium silicate (Florisil). The column is eluted with petroleum ether containing increasing proportions of acetone and those fractions which, on the basis of paper chromatographic analysis, are found to contain the desired material are combined and evaporated to dryness. The product so obtained is dissolved in methylene chloride and washed with 20% aqueous hydriodic acid. The methylene chloride solution is evaporated to dryness and the solid residue is recrystallized three times from a mixture of methylene chloride and ethyl acetate. There is thus obtained 1-phenyl - 2 - [p - (3 - pyrrolidinopropyl)phenyl] - 6 - methoxy - 1,2,3,4 - tetrahydro - 1,2 - naphthalenediol hydriodide.

EXAMPLE 7

*1 - phenyl - 2 - [p - (3 - dimethylaminopropyl)phenyl] - 6 - methoxy - 1,2,3,4 - tetrahydro - 1,2 - naphthalenediol (I) and the hydrochloride and hydriodide thereof*

Using the procedure described in Example 6, but replacing the Grignard reagent from p-(3-pyrrolidinopropyl)bromobenzene by that from p-(3-dimethylaminopropyl)bromobenzene, there are obtained 1-phenyl-2-[p-(3-dimethylaminopropyl)phenyl] - 6 - methoxy - 1,2,3,4-tetrahydro - 1,2 - naphthalenediol and the hydrochloride and hydriodide thereof.

Similarly, using the procedure of Example 6 but using the Grignard reagents prepared from p-(3-diethylaminopropyl)-, p-(3-diisopropylaminopropyl)-, p-(3-dihexylaminopropyl)-, p-(3-morpholinopropyl)-, p - (3 - piperidinopropyl)-, p-(3-piperazinopropyl)-, p-(2-pyrrolidinoethyl)-, p-(2-pyrrolidino-1-methylethyl)-, p-(4-pyrrolidinobutyl)-, and p-(5-pyrrolidinopentyl)bromobenzenes, there are respectively obtained:

1-phenyl-2-[p-(3-diethylaminopropyl)phenyl]-6-methoxy-1,2,3,4-tetrahydro-1,2-naphthalenediol,
1-phenyl-2-[p-(3-diisopropylaminopropyl)phenyl]-6-methoxy-1,2,3,4-tetrahydro-1,2-naphthalenediol,
1-phenyl-2-[p-(3-morpholinopropyl)phenyl]-6-methoxy-1,2,3,4-tetrahydro-1,2-naphthalenediol,
1-phenyl-2-[p-(3-piperidinopropyl)phenyl]-6-methoxy-1,2,3,4-tetrahydro-1,2-naphthalenediol,
1-phenyl-2-[p-(3-piperazinopropyl)phenyl]-6-methoxy-1,2,3,4-tetrahydro-1,2-naphthalenediol,
1-phenyl-2-[p-(2-pyrrolidinoethyl)phenyl]-6-methoxy-1,2,3,4-tetrahydro-1,2-naphthalenediol,
1-phenyl-2-[p-(2-pyrrolidino-1-methylethyl)phenyl]-6-methoxy-1,2,3,4-tetrahydro-1,2-naphthalenediol,
1-phenyl-2-[p-(4-pyrrolidinobutyl)phenyl]-6-methoxy-1,2,3,4-tetrahydro-1,2-naphthalenediol, and
1-phenyl-2-[p-(5-pyrrolidinopentyl)phenyl]-6-methoxy-1,2,3,4-tetrahydro-1,2-naphthalenediol,
and the hydrochlorides and hydriodides thereof.

In the same manner following the procedure of Example 6, other compounds of Formula VII, such as those listed in Example 3, above, can be substituted as starting material in place of 1-phenyl-1-hydroxy-6-methoxy-3,4-dihydro-2(1H)-naphthalenone in Example 6, above, to obtain other compounds of Formula I, wherein Y is

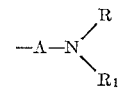

in which A, R and $R_1$ have the meanings previously given. The following are representative:

1-(p-tolyl)-1-hydroxy-6-methoxy-3,4-dihydro-2(1H)-naphthalenone with the Grignard reagent from p-(3-pyrrolidinopropyl)bromobenzene to obtain 1-(p-tolyl)-2-[p-(3-pyrrolidinopropyl)phenyl]-6-methoxy-1,2,3,4-tetrahydro-1,2-naphthalenediol;

1-(p-fluorophenyl)-1-hydroxy-6-methoxy-3,4-dihydro-2(1H)-naphthalenone with the Grignard reagent from p-(3-dimethylaminopropyl)bromobenzene to obtain 1-(p-fluorophenyl)-2-[p-(3-dimethylaminopropyl)phenyl]-6-methoxy-1,2,3,4-tetrahydro-1,2-naphthalenediol;

1-(m-trifluoromethylphenyl)-1-hydroxy-6-methoxy-3,4-dihydro-2-(1H)-naphthalenone with the Grignard reagent from p-(2-pyrrolidinoethyl)bromobenzene to obtain 1-(m-trifluoromethylphenyl)-2-[p-(2-pyrrolidinoethyl)phenyl]-6-methoxy-1,2,3,4-tetrahydro-1,2-naphthalenediol;

and the hydrochlorides and hydriodides thereof.

Similarly, other pharmacologically acceptable acids such as those hereinbefore listed can be used in place of hydrochloric acid or hydroiodic acid in the procedures of Examples 6 and 7 to obtain the corresponding acid addition salts.

EXAMPLE 8

*1-phenyl - 2 - [p-(3-dimethylaminopropyl)phenyl]-6-methoxy-1,2,3,4-tetrahydro - 1,2-naphthalenediol methiodide*

A solution of 1 g. of 1-phenyl-2-[p-(3-dimethylaminopropyl)phenyl]-6-methoxy-1,2,3,4-tetrahydro-1,2 - naphthalenediol in 12 ml. of acetonitrile is cooled in ice. To the cooled solution is added 1.4 ml. of methyl iodide and the mixture is allowed to stand overnight before being poured into 100 ml. of diethyl ether. The solid which separates is isolated by filtration and recrystallized from a mixture of acetonitrile and diethyl ether. There is thus obtained 1-phenyl-2-[p-(3-dimethylaminopropyl)phenyl]-6-methoxy-1,2,3,4-tetrahydo - 1,2-napthalenediol methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 1-phenyl-2-[p-(3-dimethylaminopropyl)phenyl]-6-methoxy - 1,2,3,4 - tetrahydro-1,2-naphthalenediol.

Similarly, using the procedure described in Example 8, but replacing 1-phenyl-2-[p - (3-dimethylaminopropyl)phenyl]-6-methoxy-1,2,3,4 - tetrahydro - 1,2-napthalenediol by other free bases of Formula 1, for example those described in Examples 6 and 7, there are obtained the corresponding methiodides and like quaternary ammonium salts

EXAMPLE 9

*1-phenyl - 2 - [p-(3-dimethylaminopropyl)phenyl]-6-methoxy-1,2,3,4-tetrahydro - 1,2 - naphthalenediol methochloride*

A solution of 1 g. of 1-phenyl-2-[p-(3-dimethylaminopyl) phenyl]-6-methoxy-1,2,3,4-tetrahydro-1,2 - naphthalenediol methiodide in dimethylformamide is shaken with a suspension of silver oxide until the precipitation of silver iodide is complete. The resulting mixture is filtered and the filtrate containing the corresponding quaternary ammonium hydroxide is neutralized by the addition of aqueous hydrochloric acid. The resulting mixture is evaporated to dryness to obtain 1-phenyl-2-[p-(3-dimethylaminopropyl)phenyl]-6-methoxy-1,2,3,4 - tetrahydro-1,2-naphthalenediol methochloride.

Similarly, using the above procedure, but replacing hydrochloric acid by other acids such as sulfuric acid, hydrobromic acid, phosphoric acid, acetic acid, methanesulfonic acid, and the like, there are obtained the corresponding quaternary ammonium salts.

In like manner, using the above procedure, the anion of any of the quaternary salts of the invention can be exchanged by any other desired anion by forming the corresponding quaternary ammonium hydroxide and reacting the latter with the appropriate acid.

What is claimed is:
1. A compound of the formula:

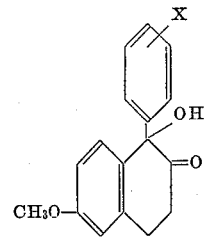

wherein X is hydrogen, halogen, trifluoromethyl or loweralkyl of 1 to 8 carbon atoms, inclusive.

2. 1-phenyl-1-hydroxy-6-methoxy-3,4 - dihydro-2(1H)-naphthalenone, a compound of claim 1 wherein X is hydrogen.

References Cited
UNITED STATES PATENTS

| | | |
|---|---|---|
| 2,566,357 | 9/1951 | Orchin et al. |
| 3,320,271 | 5/1967 | Lednicer. |

DANIEL D. HORWITZ, Primary Examiner